(12) United States Patent
Chandrachood

(10) Patent No.: US 7,610,357 B1
(45) Date of Patent: Oct. 27, 2009

(54) PREDICTIVELY RESPONDING TO SNMP COMMANDS

(75) Inventor: Santosh S. Chandrachood, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 790 days.

(21) Appl. No.: 09/895,047

(22) Filed: Jun. 29, 2001

(51) Int. Cl.
*G06F 15/16* (2006.01)

(52) U.S. Cl. .................. 709/219; 709/217; 709/218; 709/223; 711/100

(58) Field of Classification Search .............. 709/223, 709/217–219; 711/100
See application file for complete search history.

(56) References Cited

U.S. PATENT DOCUMENTS

| | | | | |
|---|---|---|---|---|
| 5,592,620 | A * | 1/1997 | Chen et al. | 709/223 |
| 5,864,854 | A * | 1/1999 | Boyle | 707/10 |
| 5,878,223 | A * | 3/1999 | Becker et al. | 709/223 |
| 5,954,801 | A * | 9/1999 | Sokolov | 710/5 |
| 5,958,040 | A * | 9/1999 | Jouppi | 712/207 |
| 5,999,948 | A * | 12/1999 | Nelson et al. | 715/207 |
| 6,076,107 | A * | 6/2000 | Chen et al. | 709/224 |
| 6,092,149 | A * | 7/2000 | Hicken et al. | 711/113 |
| 6,094,680 | A * | 7/2000 | Hokanson | 709/223 |
| 6,105,061 | A * | 8/2000 | Nakai | 709/223 |
| 6,115,768 | A * | 9/2000 | Yamamoto | 710/107 |
| 6,151,630 | A * | 11/2000 | Williams | 709/229 |
| 6,167,438 | A * | 12/2000 | Yates et al. | 709/216 |
| 6,182,122 | B1 * | 1/2001 | Berstis | 709/217 |
| 6,182,133 | B1 * | 1/2001 | Horvitz | 709/223 |
| 6,260,115 | B1 * | 7/2001 | Permut et al. | 711/134 |
| 6,438,652 | B1 * | 8/2002 | Jordan et al. | 711/120 |
| 6,442,651 | B2 * | 8/2002 | Crow et al. | 711/118 |
| 6,484,239 | B1 * | 11/2002 | Hill et al. | 711/137 |
| 6,510,469 | B1 * | 1/2003 | Starnes et al. | 709/247 |
| 6,539,382 | B1 * | 3/2003 | Byrne et al. | 707/10 |
| 6,728,840 | B1 * | 4/2004 | Shatil et al. | 711/137 |
| 6,742,033 | B1 * | 5/2004 | Smith et al. | 709/224 |
| 6,792,507 | B2 * | 9/2004 | Chiou et al. | 711/119 |
| 6,937,966 | B1 * | 8/2005 | Hellerstein et al. | 703/2 |
| 2001/0003828 | A1 * | 6/2001 | Peterson et al. | 709/219 |
| 2001/0047456 | A1 * | 11/2001 | Schrobenhauzer et al. | 711/122 |

OTHER PUBLICATIONS

Case, J., Fedor, M., and Schoffstall M. et al. A Simple Network Management Protocol (SNMP). May 1990. RFC 1157. http://www.ietf.org/rfc/rfc1157.txt?number=1157. pp. 6, 13, 18.*
Murray, J. D., Windows NT SNMP, 1998, O'Reilly & Associates, Inc., pp. iv, 59-91.*
"Simple Networking Management Protocol (SNMP)", Internetworking Technology Overview, Chapter 52, Jun. 1999, pp. 52-1 to 52-11, coolcram.com/files/snmp.pdf.

* cited by examiner

*Primary Examiner*—Jeffrey Pwu
*Assistant Examiner*—Alicia Baturay
(74) *Attorney, Agent, or Firm*—Patent Captial Group

(57) ABSTRACT

A method for predictively responding to network management data requests includes populating a memory with prefetched response data based on whether one or more requests matches a predetermined pattern and sending a response including the prefetched response data if a request matches the pattern and if the memory includes response data corresponding to the request. The pattern includes one or more expected requests and the periodicity of the one or more expected requests. The response data includes information prefetched from at least one subsystem on a managed network device. According to one aspect, the managed network device is configured with a Simple Network Management Protocol (SNMP) agent that responds to requests from a SNMP manager.

20 Claims, 12 Drawing Sheets

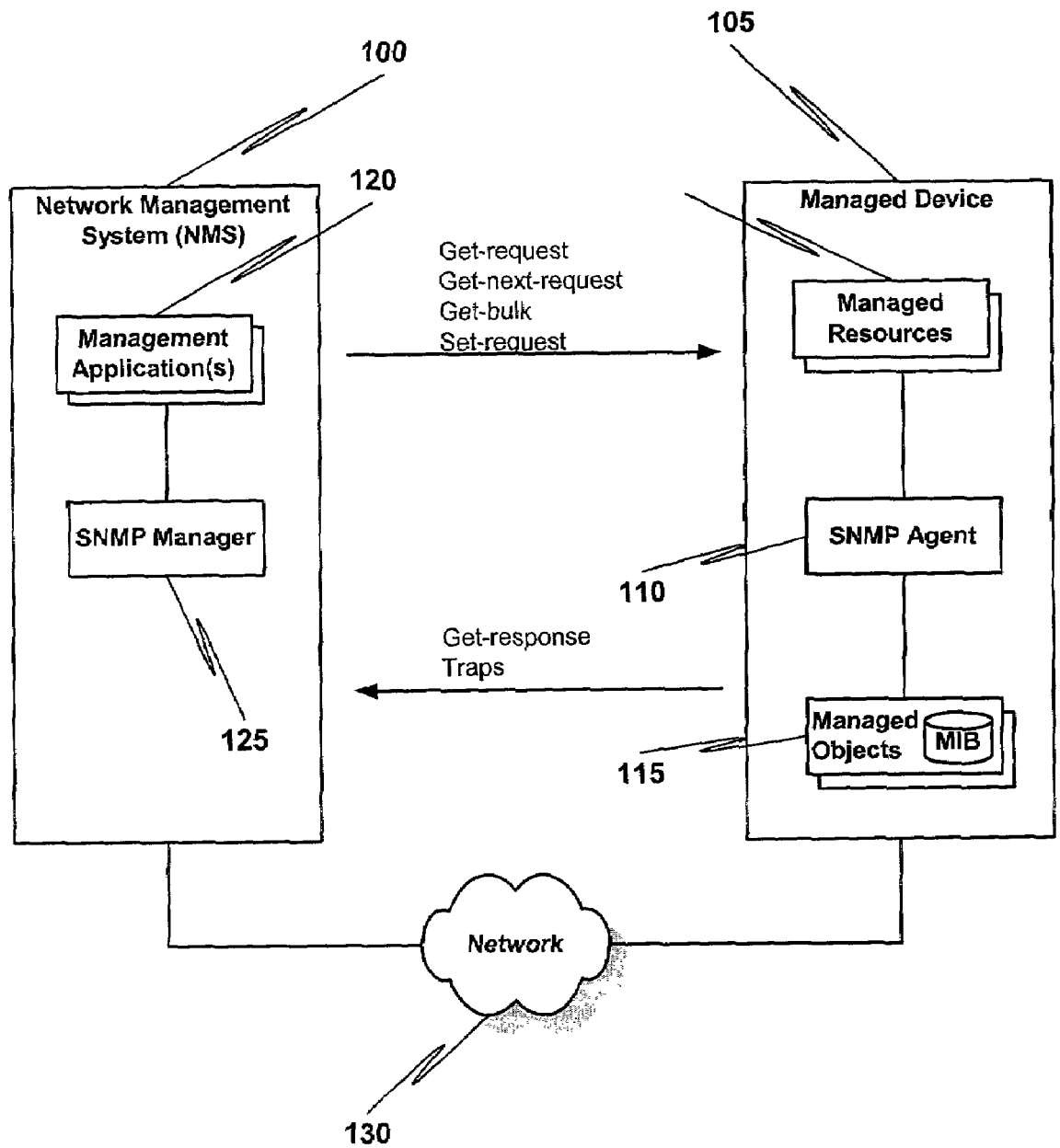
FIG. 1 - Prior Art

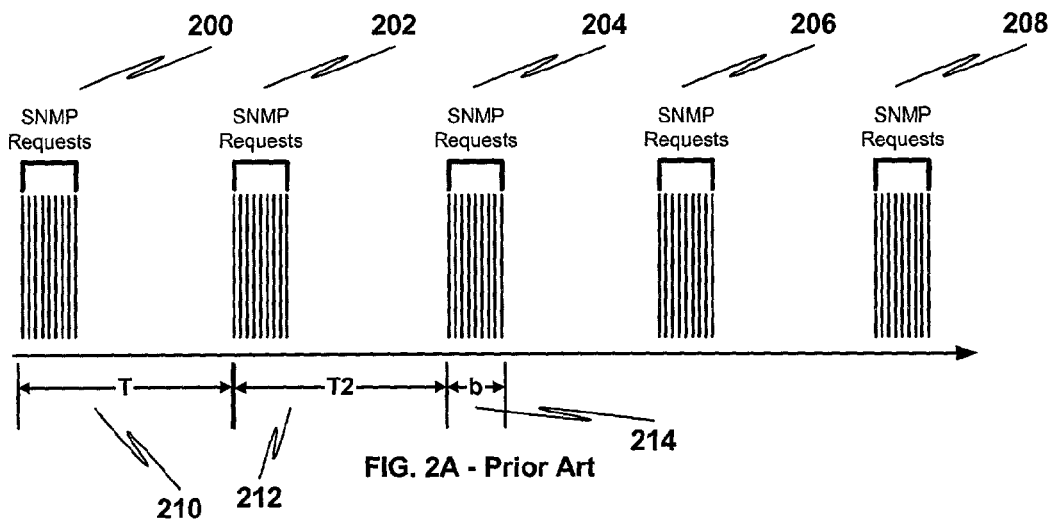
FIG. 2A - Prior Art
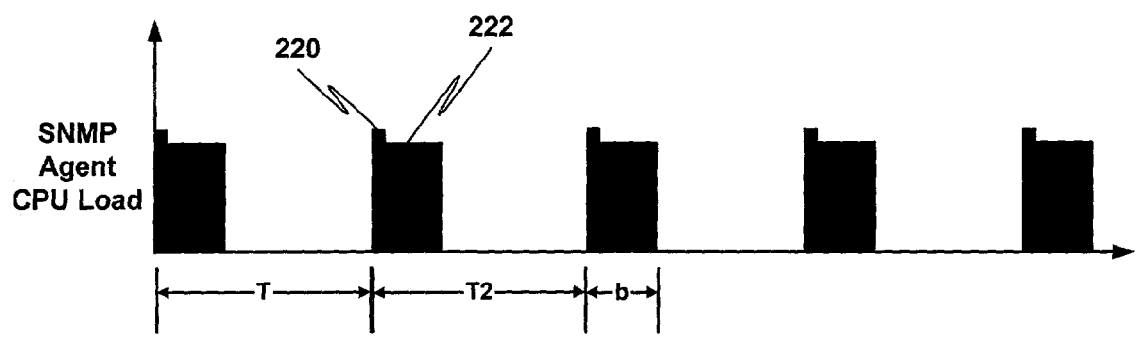
FIG. 2B - Prior Art
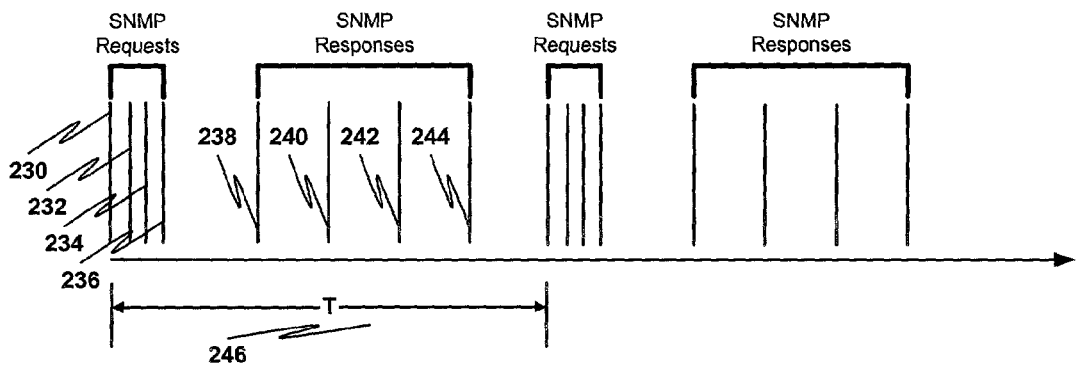
FIG. 2C - Prior Art

PREDICTIVELY RESPONDING TO SNMP COMMANDS

FIELD OF THE INVENTION

The present invention relates to the field of computer science. More particularly, the present invention relates to a method and apparatus for predictively responding to Simple Network Management Protocol (SNMP) commands.

BACKGROUND OF THE INVENTION

A successful communication network depends in large part on planning. Part of planning includes designing the various devices in the network for ease of management. Managed devices may include routers, switches, access servers, and the like. To this end, a communication protocol known as Simple Network Management Protocol (SNMP) was developed and is commonly utilized. SNMP operations include "Get" and "Get-next" requests for reading information and "Set" requests for configuring information. Typically, most SNMP requests are requests to "Get" data. Exemplary SNMP operations are described in Table 1, listed below.

TABLE 1

| Operation | Description |
|---|---|
| Get-request | Retrieve a value from a specific MIB variable. |
| Get-next-request | Retrieve a value of the object instance that is next in the lexicographical order of a specific MIB variable specified. With this operation, a SNMP manager does not need to know the exact variable name. A sequential search is performed to find the needed variable within a table. |
| Get-response | The reply to a get-request, get-next-request, and set-request sent by a NMS. |
| Set-request | Store a value in a specific variable. |
| Trap | An unsolicited message sent by a SNMP agent to a SNMP manager indicating that some event has occurred. |

FIG. 1 is a block diagram that illustrates a typical network employing SNMP to manage network devices. In general, the management of the network is controlled by a Network Management System (NMS) 100. A NMS 100 executes management applications 120 that monitor and control managed devices 105 at regular intervals via a SNMP Manager 125. The SNMP Manager 125 forms Protocol Data Units (PDUs) and sends them to the managed devices. Each managed device 105 includes a SNMP agent 110 that processes the PDU, authenticates it and retrieves information requested by the NMS 100. Each managed device 105 maintains this requested information in a Management Information Base (MIB) 115. Some MIB 115 variables may depend on other variables. The values for the variables are typically stored in a table. There may be many tables in a particular MIB 115 and there may be more than one MIB 115 for each managed device. The size of a MIB table may vary from a few values to hundreds or even thousands of values depending on the managed device 105.

FIGS. 2A-2C illustrate typical timing of SNMP requests and responses. FIG. 2A is a timing diagram that illustrates typical timing of SNMP requests issued by a NMS. Reference numeral 214 indicates the time during which SNMP requests are generated, also known as the "burst". As shown in FIG. 2A, SNMP requests 200-208 are typically periodic. The same set of requests is typically repeated after interval T (210). Moreover, the sequence and content of SNMP requests to a particular SNMP agent are typically invariant over multiple bursts. Thus, a SNMP agent typically responds to the same set of SNMP requests each period.

FIG. 2B is a timing diagram that illustrates typical SNMP agent CPU loading due to SNMP requests. The agent SNMP CPU loading is typically irregular, with a spike 220 in CPU loading occurring at the beginning of each burst 222. This spike 220 in CPU loading is typically due to the initialization of data structures at the beginning of each burst.

FIG. 2C is a timing diagram that illustrates typical SNMP requests and corresponding responses. Requests 230-236 correspond with responses 238-244, respectively. Note there is a relatively small time between each successive request and a relatively long period between each corresponding response. This added delay is typically caused by the time required for the SNMP agent to process the preceding request. Thus, response 240 is delayed by the processing time for request 230. The effect of processing delays is also cumulative. Hence, response 242 is delayed by the processing time for requests 230 and 232 and response 244 is delayed by the processing time for requests 230, 232 and 234. This behavior means that the number of requests a NMS can send per burst is limited by the size of period T 246.

SNMP agent processing often requires collecting the requested information from one or more subsystems. For example, a router may support multiple interfaces and the SNMP agent must collect information from each of the interfaces. Interfacing with another subsystem typically involves communicating with an application or process running on the same CPU or on a different CPU. This inter-process communication (IPC) typically results in communication delays that increase the amount of time required to collect information. The inter-process communication also uses precious CPU cycles that could otherwise be utilized for the core functionality of the network device. For example, inter-process communication delays for a network router SNMP agent use CPU cycles that could otherwise be utilized for core routing functions.

Moreover, each request is handled serially, without regard to preceding or succeeding requests. If data request from one subsystem is interspersed with data requests for another subsystem, then this process is inefficient. For example, a burst that includes a request for variable X from subsystem 1 ($X_1$), followed by a request for $Y_2$ followed by a request for $Z_1$ generates two requests from subsystem 1 and one from subsystem 2.

There is an increasing trend towards putting more subsystems in network devices, resulting in more SNMP requests and more inter-process communication. But as discussed above, the number of requests a NMS can send per burst is limited by the size of period T 246. In addition, management applications typically require current information regarding managed devices. Thus, it is desirable to increase the amount of data collected without decreasing the frequency of data collection (increasing the period T 246).

What is needed is a solution that enables responding to network management requests relatively efficiently thereby increasing the amount of data that may be requested per unit time. A further need exists for such a solution that enables relatively even processing loads when responding to a group of requests. A further need exists for such a solution that can be implemented without network manager modification. Yet another need exists for such a solution that uses open and well-understood standards.

BRIEF DESCRIPTION OF THE INVENTION

A method for predictively responding to network management data requests includes populating a memory with prefetched response data based on whether one or more requests matches a predetermined pattern and sending a response including the prefetched response data if a request matches the pattern and if the memory includes response data corresponding to the request. The pattern includes one or more expected requests and the periodicity of the one or more expected requests. The response data includes information prefetched from at least one subsystem on a managed network device. According to one aspect, the managed network device is configured with a Simple Network Management Protocol (SNMP) agent that responds to requests from a SNMP manager.

An apparatus for predictively responding to network management data requests includes a request classifier to classify a request based on whether one or more received requests matches a predetermined pattern. The pattern includes one or more expected request and the periodicity of the one or more expected request. The apparatus also includes a lookahead processor coupled to the request classifier. The lookahead processor is configured to populate a memory with prefetched response data in response to a signal from the request classifier. The response data includes information prefetched from at least one subsystem on a managed network device. The apparatus also includes a an interfacer coupled to the lookahead processor. The interfacer interfaces with the one or more subsystem on the managed network device to provide the response data. The interfacer is also coupled to a sender that sends a response including the prefetched response data if a received request matches the pattern and if the memory includes response data corresponding to the received request. According to one aspect, the managed network device is configured with a Simple Network Management Protocol (SNMP) agent that responds to requests from a SNMP manager.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a block diagram that illustrates a typical network employing the Simple Network Management Protocol (SNMP) to manage network devices.

FIG. 2A is a timing diagram that illustrates typical timing of SNMP requests issued by a network manager.

FIG. 2B is a timing diagram that illustrates typical SNMP agent CPU loading due to SNMP requests.

FIG. 2C is a timing diagram that illustrates typical SNMP requests and corresponding responses.

DETAILED DESCRIPTION OF A PREFERRED EMBODIMENT

Figure 3A:
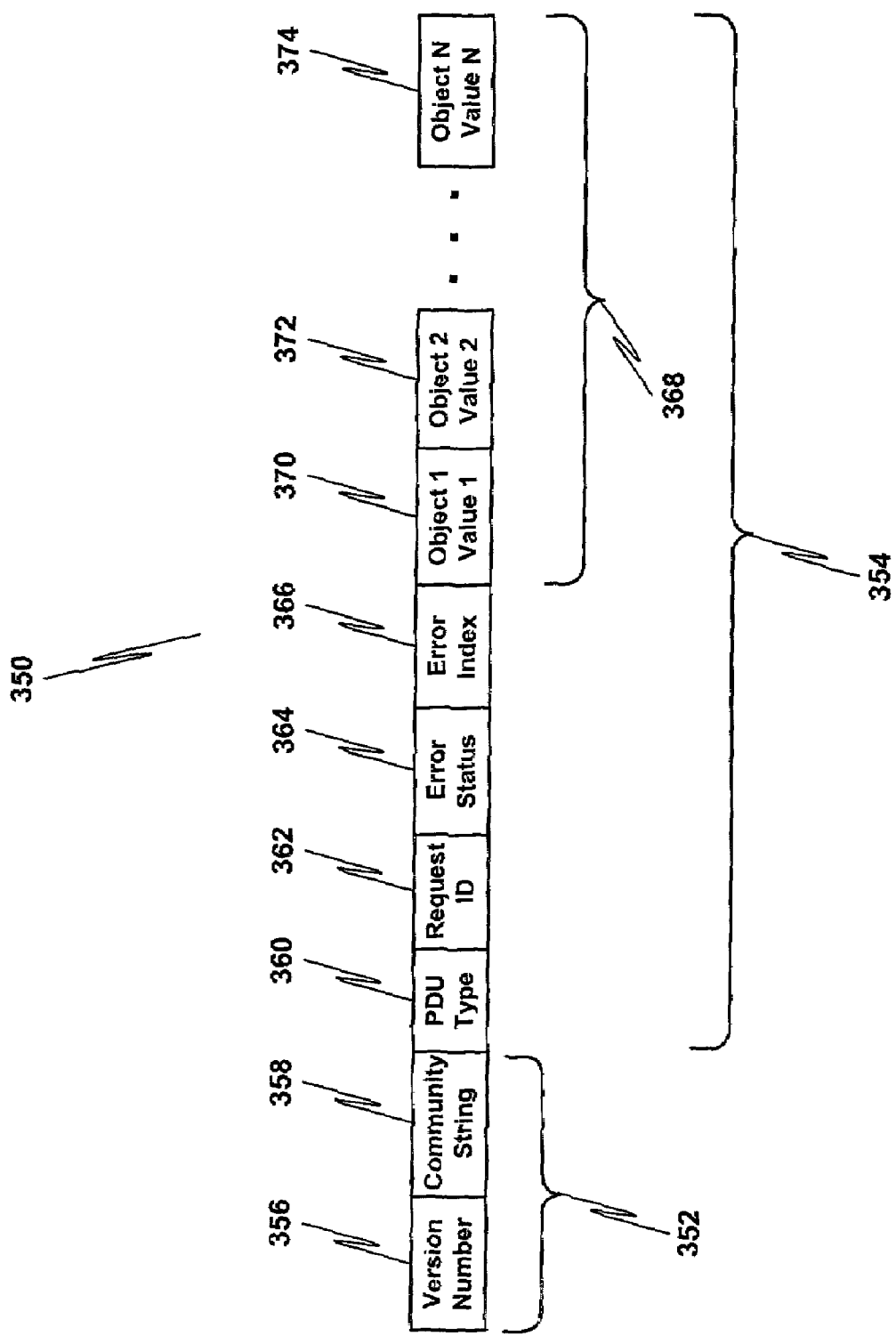
FIG. 3A is a block diagram that illustrates a SNMP message format.

Embodiments of the present invention are described herein in the context of a method and apparatus for predictively responding to Simple Network Management Protocol (SNMP) commands. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to embodiments of the present invention, a network agent populates a memory with prefetched response data based on whether one or more data requests match a predetermined pattern. A response that comprises the prefetched response data is sent if the memory includes the response data corresponding to the request.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

As is known to those skilled in the art, network devices may be configured and managed using either out-of-band or in-band techniques. Out-of-band configuration and management are typically performed by connecting to the console port on the network device and using the management console locally from a terminal or remotely through a modem. Alternatively, network devices may be configured and managed "in-band," either by connecting via Telnet to the network device and using a management console, or by communicating with the network device's in-band management interface using the industry standard Simple Network Management Protocol ("SNMP"). This can be accomplished by using a SNMP-compatible network management application and the network device's Management Interface Base ("MIB") files. Normally, however, in order to perform in-band administrative tasks of a network device, such as configuration and management, the network device must first be assigned an IP address. Additionally, in order to use in-band configuration and management capabilities, the SNMP management platform of the network device must be configured to understand and be able to access the objects contained in the network device's MIB. Embodiments of the present invention use in-band network management techniques.

Embodiments of the present invention can use the Internet Protocol or a proprietary Cluster Management Protocol ("CMP") as the underlying mechanism to transport the SNMP configuration and management data. Without limitation, the protocols implemented in embodiments of the present invention include the Internet Protocol ("IP"), the Internet Control Message Protocol ("ICMP"), the User Datagram Protocol ("UDP"), the Trivial File Transfer Protocol ("TFTP"), the Bootstrap Protocol ("BOOTP"), and the Address Resolution Protocol ("ARP").

The MIB variables of network devices according to embodiments of the present invention are accessible through SNMP. As has been mentioned earlier, SNMP is an application-layer protocol designed to facilitate the exchange of management information between network devices. SNMP is used to monitor IP gateways and their networks, and defines a set of variables that the gateway must keep and specifies that all operations on the gateway are a side effect of fetching or storing to data variables. SNMP consists of three parts: a Structure of Management Information ("SMI"), a Management Information Base ("MIB") and the protocol itself. The SMI and MIB define and store the set of managed entities, while SNMP itself conveys information to and from the SMI and the MIB.

Instead of defining a large set of commands, SNMP places all operations in a get-request, get-next-request, and set-request format. For example, a SNMP manager can get a value from a SNMP agent or store a value into that SNMP agent. The SNMP manager can be part of a network management system ("NMS"), and the SNMP agent can reside on a networking device such as a router. The device MIB files may be compiled with network management software, which then permits the SNMP agent to respond to MIB-related queries being sent by the NMS.

The CiscoWorks™ software package, available from Cisco Systems, Inc. of San Jose, Calif., is an example of network management product supporting SNMP. CiscoWorks™ uses the device MIB variables to set device variables and to poll devices on the network for specific information. Among other tasks, the CiscoWorks™ software permits the results of a poll to be displayed as a graph and analyzed in order to troubleshoot internetworking problems, increase network performance, verify the configuration of devices, and monitor traffic loads. Other products known to those skilled in the art, available from several other vendors, provide similar functionality.

As is known to those skilled in the art, the SNMP model typically assumes that each managed network device is capable of running a SNMP agent internally. However, some devices, such as older devices that were not originally intended for use on a network, may not have this capability. To handle them, the SNMP protocol defines what is called a "SNMP proxy agent," namely an agent that watches over one or more non-SNMP devices and communicates with the management console on their behalf, typically communicating with the non-SNMP devices themselves using some non-standard or proprietary protocol. Typically, the SNMP proxy agent operates by translating the SNMP interactions it receives from the management console into whatever protocols are supported by the foreign device.

FIG. 3A is a block diagram illustrating an exemplary SNMP message format known to those skilled in the art. FIG. 3A illustrates the message format for a version of SNMP known to those skilled in the art as "SNMPv1." Depending on the requirements of each particular implementation, embodiments of the present invention may be implemented using other versions of SNMP, or using versions of other network management protocols known to those skilled in the art.

As shown in FIG. 3A, SNMP message 350 comprises a message header 352 and a Protocol Data Unit ("PDU") 354. Message header 352 comprises a Version Number field 356 and a Community String 358. Version Number field 356 specifies the version of the SNMP protocol being used, while community string 358 defines an access environment for a group of network management stations/consoles. Network management stations/consoles within a community are said to exist within the same administrative domain. As is known to those skilled in the art, community strings serve as a weak form of authentication because devices that do not know the proper community name are precluded from SNMP operations.

Still referring to FIG. 3A, PDU 354 of SNMP message 350 comprises a PDU Type field 360, Request ID field 362, Error Status field 364, Error Index field 366, and a Variable Bindings field 368. As is known to those skilled in the art, PDU fields are variable in length. PDU Type field 360 specifies the type of PDU transmitted (e.g., Get, GetNext, Response, Set). Request ID field 362 associates a SNMP requests with the corresponding response. Error Status field 364 indicates one of a number of errors and error types. Only the response operation sets this field. Other operations set this field to zero. Error Index field 366 associates an error with a particular object instance (if there is an error, the error index is set to a non-zero error code). Variable Bindings field 368 serves as the data field of the SNMP PDUs. As is known to those skilled in the art, each variable binding 370, 372, 374 associates a particular object instance with its current value (with the exception of Get and GetNext requests, for which the value is ignored). It should be noted that, as is known to those skilled in the art, SNMP also defines a PDU known as a "trap."

Embodiments of the present invention described herein are discussed with specific references to SNMP in order to facilitate understanding, but the mechanisms and methodology described herein work equally well with other network management protocols such as simple network management protocol version 2 (SNMPv2).

For the purposes of this disclosure, the term "SNMP core" is used to denote an application that implements basic SNMP agent functionality, responding to each SNMP command in a serial manner as known to those skilled in the art. The terms "SNMP agent" and "agent" are used to denote embodiments of the present invention.

Figure 3B:
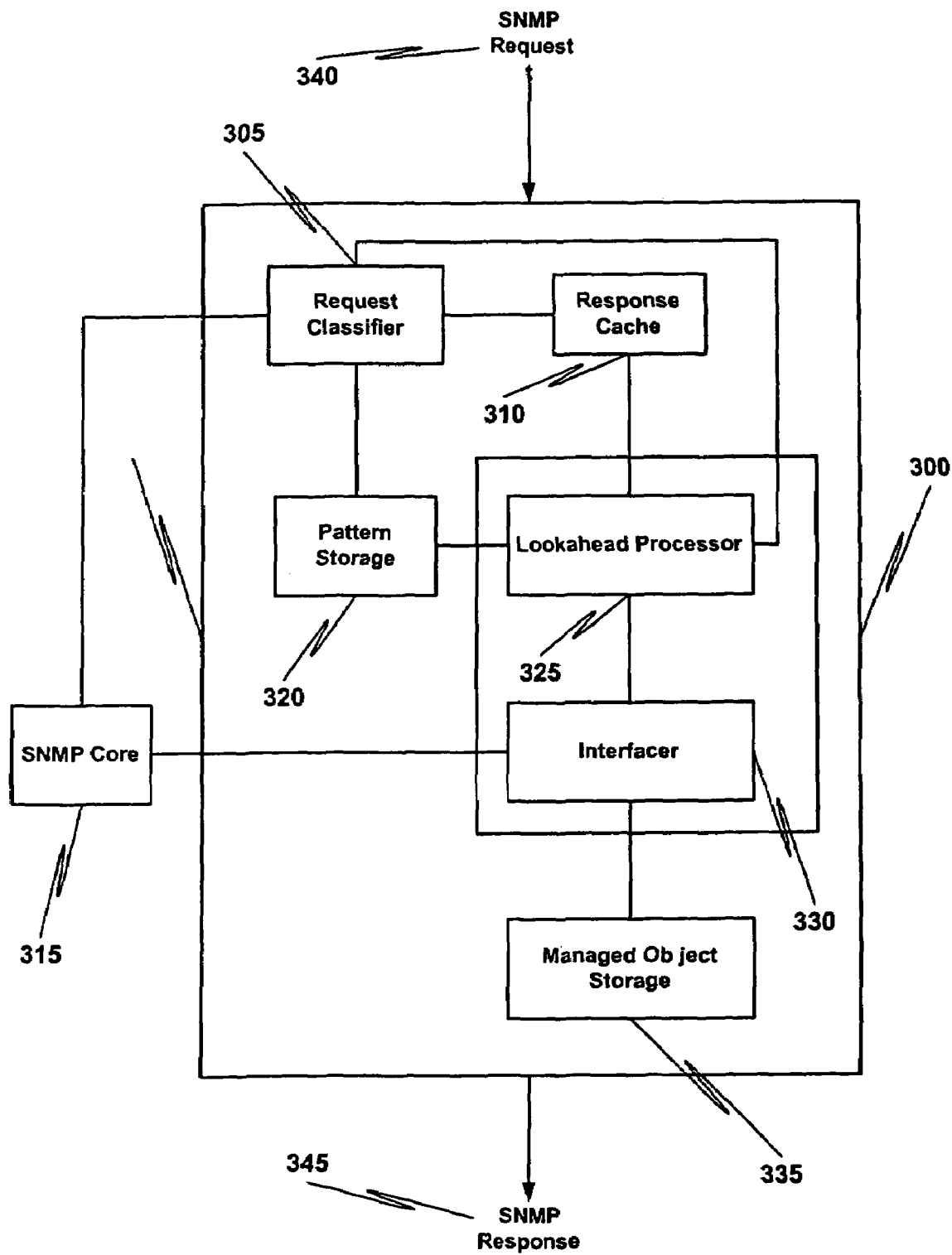
FIG. 3B is a block diagram that illustrates an apparatus for predictively responding to SNMP commands in accordance with one embodiment of the present invention.

Turning now to FIG. 3B, a block diagram that illustrates an apparatus for predictively responding to SNMP commands in accordance with one embodiment of the present invention is presented. SNMP agent 300 includes a request classifier 305 coupled to a response cache 310 and a pattern storage 320. SNMP agent 300 may be part of a networked device such as a router, switch, access server or the like. SNMP agent 300 may also comprise a SNMP proxy agent. Request classifier 305 is also coupled to a SNMP core that implements basic SNMP functionality, responding to each SNMP command in a serial manner as known to those skilled in the art. Agent 300 also includes a lookahead processor 325 coupled to the pattern storage 320 and the response cache 310. An interfacer 330 is coupled to the SNMP core 315 and a managed object storage 335.

In operation, request classifier 305 receives a SNMP request 340, compares the request to at least one pattern stored in pattern storage 320, and classifies the request based on whether it matches a pattern. A pattern comprises one or more expected requests and the periodicity of the one or more requests. Request classifier 305 sends the received request to SNMP core 315 if the request does not match a pattern. SNMP core 315 implements basic SNMP agent functionality, responding to each request in a serial manner. If the request matches a pattern, request classifier 305 looks for the corresponding response in response cache 310. If the corresponding response is found, response classifier 305 sends a SNMP response 345 using the response obtained from response cache 310. If the corresponding response is not found, lookahead processor 325 examines the requests comprising the pattern, groups the request according to the subsystem responsible for providing the information and sends the grouped requests to interfacer 330. Interfacer 330 interfaces with a managed object storage 335 such as a MIB to obtain the information requested and returns the grouped response data to lookahead processor 325. Lookahead processor 325 receives the grouped response data, creates response packets and stores the response packets in response cache 310. A sender (not shown in FIG. 3B) receives a response from request classifier 305 and sends the SNMP response 345.

Many other devices or subsystems (not shown) may be connected in a similar manner. Also, it is not necessary for all of the devices shown in FIG. 3B to be present to practice the present invention, as discussed below. Furthermore, the devices and subsystems may be interconnected in different ways from that shown in FIG. 3B.

Figure 4A:
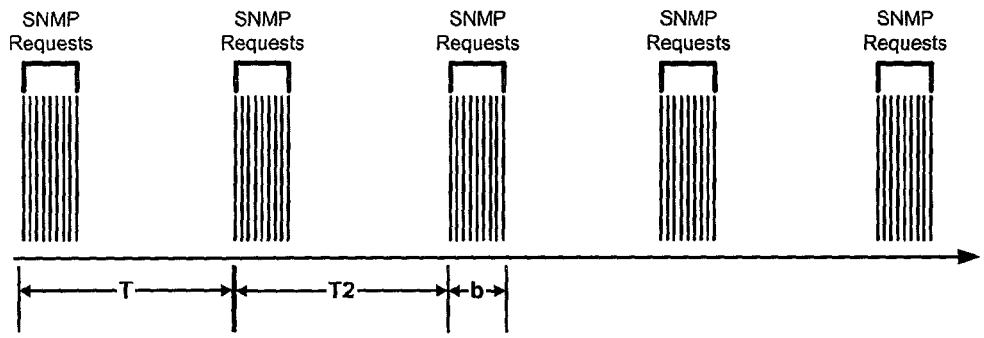
FIG. 4A is a timing diagram that illustrates the timing of SNMP requests issued by a network manager in accordance with one embodiment of the present invention.
Figure 4B:
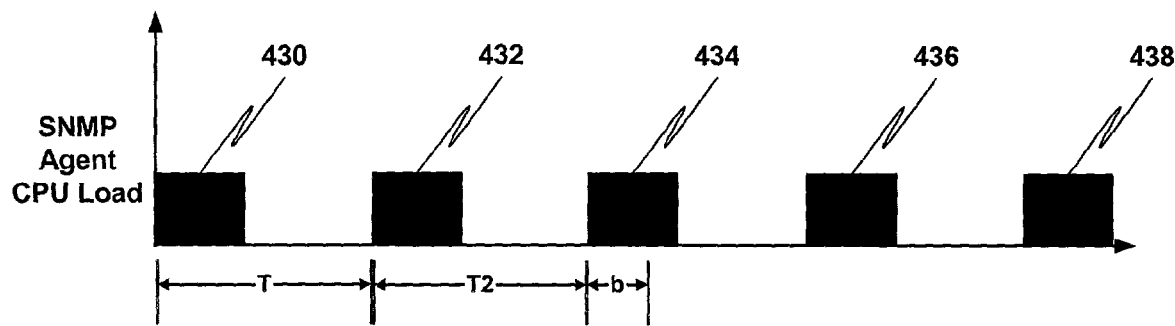
FIG. 4B is a timing diagram that illustrates SNMP agent CPU loading due to SNMP requests in accordance with one embodiment of the present invention.
Figure 4C:
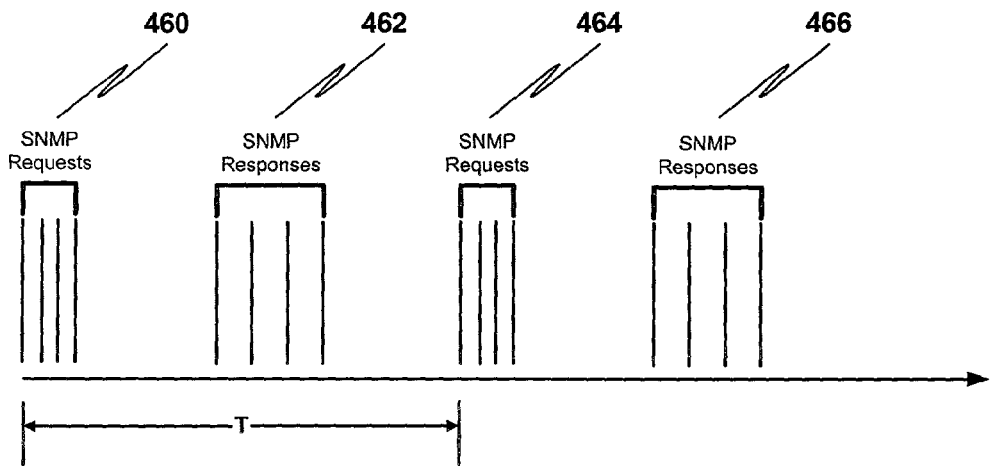
FIG. 4C is a timing diagram that illustrates SNMP requests and corresponding responses in accordance with one embodiment of the present invention.

FIGS. 4A-4C illustrate the timing of SNMP requests and responses in accordance with embodiments of the present invention.

FIG. 4A is a timing diagram that illustrates the timing of SNMP requests issued by a network manager in accordance with one embodiment of the present invention. FIG. 4A is the same as FIG. 2A and is used for comparison purposes.

FIG. 4B is a timing diagram that illustrates SNMP agent CPU load in accordance with one embodiment of the present invention. Note that the initial spike in SNMP agent CPU load 430-438 is not present, since predicting SNMP requests enables spreading initialization tasks over a wider time period.

FIG. 4C is a timing diagram that illustrates SNMP agent responses in accordance with one embodiment of the present invention. Note that the time between requests (460, 464) and the corresponding responses (462, 466) is reduced relative to that shown in FIG. 2C.

Figure 5:
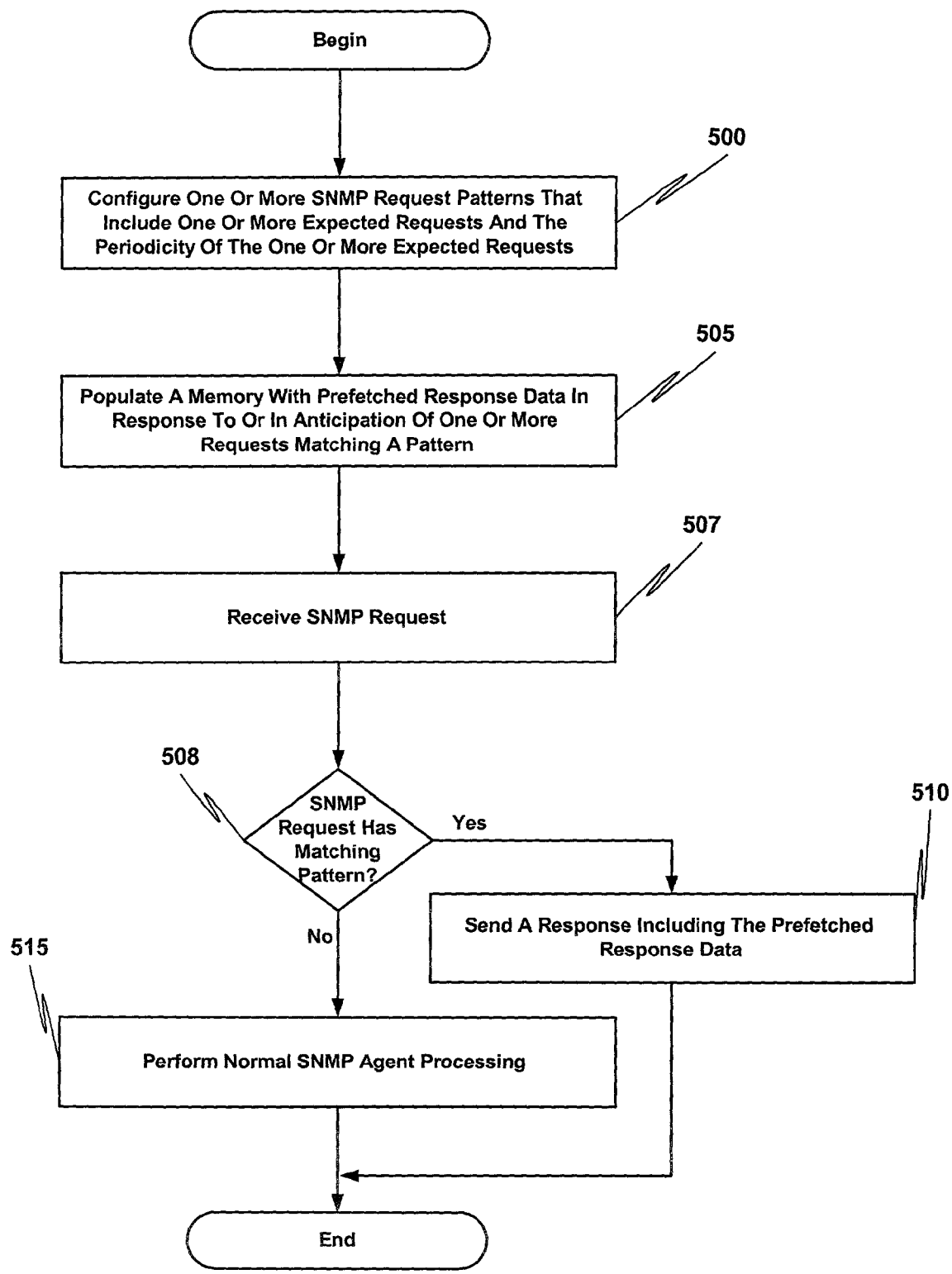
FIG. 5 is a high-level flow diagram that illustrates a method for predictively responding to SNMP commands in accordance with one embodiment of the present invention.

Turning now to FIG. 5, a high-level flow diagram that illustrates a method for predictively responding to SNMP commands in accordance with one embodiment of the present invention is presented. At 500, one or more SNMP request patterns that include one or more expected requests and the periodicity of the one or more expected requests are configured and stored in a pattern storage. At 505, a memory such as a response cache is populated with prefetched response data in response to or in anticipation of one or more requests matching a pattern.

The memory is populated with prefetched response data in response to one or more requests matching a pattern when the first request in a pattern is received. This first request or "Trigger request" initiates data collection for the trigger request and any remaining requests in a pattern. A SNMP response corresponding to the trigger request is sent upon completion of the data collection. At this point, the memory includes SNMP response data for SNMP requests that are in the pattern but which have not been received by the SNMP agent. SNMP response data for remaining requests in the pattern are obtained from the memory upon receipt of the actual request.

According to other embodiments of the present invention, the trigger request is also used to initiate periodic data collection for requests in a pattern, populating the memory with prefetched response data in anticipation of one or more requests matching a pattern. The data collection rate is tied to the period specified by the pattern. A periodic validation process ensures that only non-stale data is used to send a SNMP response.

Still referring to FIG. 5, at 507 a SNMP request is received. At 508 a determination is made regarding whether the SNMP request has a matching pattern. If the SNMP request has a matching pattern, at 510 a response including prefetched response data is sent. If the SNMP request has no matching pattern, basic SNMP agent processing is performed at 515. In other words, if a SNMP request has no matching pattern, a SNMP core processes the SNMP request in a serial fashion.

Figure 6:
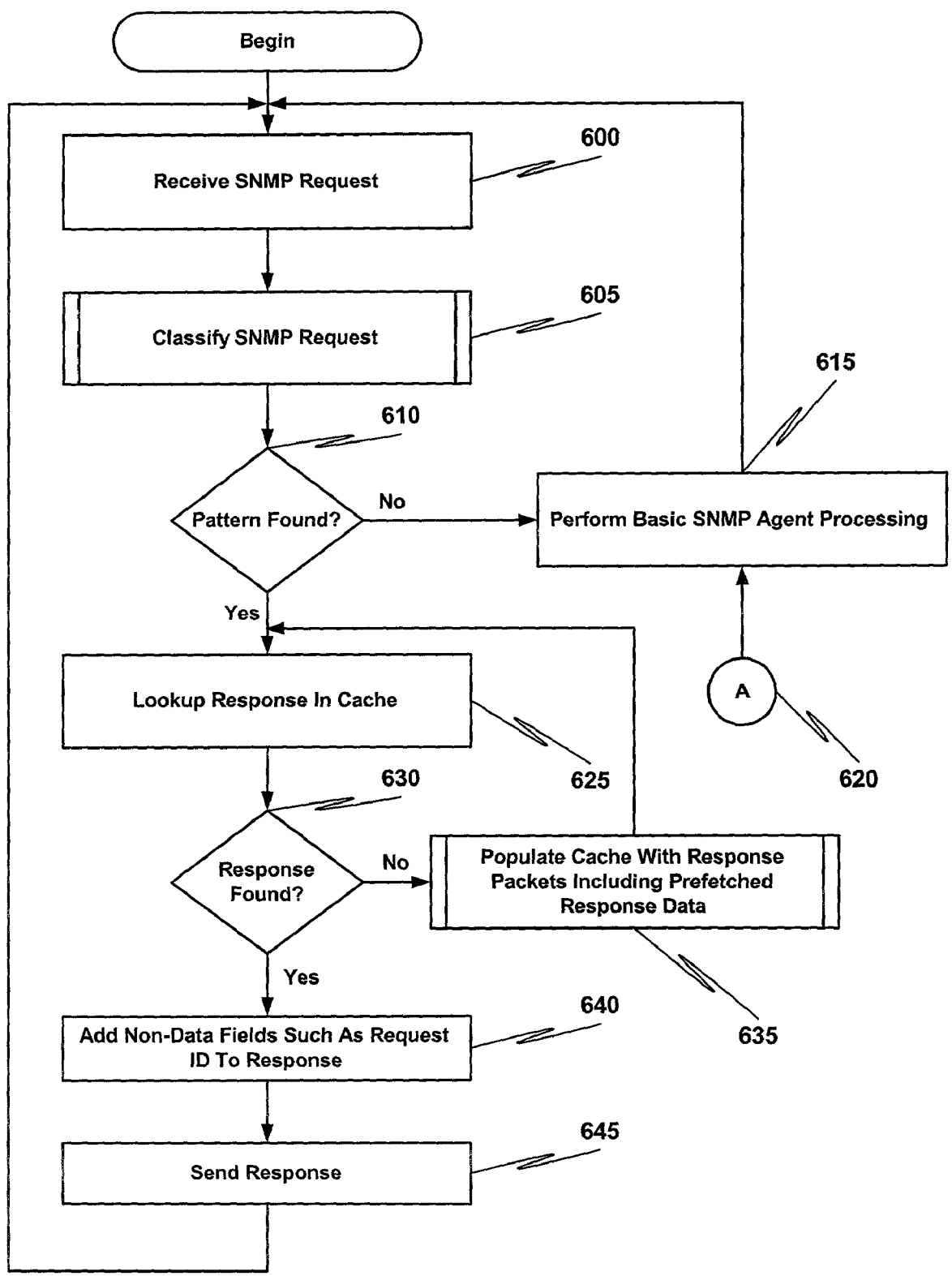
FIG. 6 is a low-level flow diagram that illustrates a method for predictively responding to SNMP commands in accordance with one embodiment of the present invention.

Turning now to FIG. 6, a low-level flow diagram that illustrates a method for predictively responding to SNMP commands in accordance with one embodiment of the present invention is presented. At 600, a SNMP request is received. At 605, the request is classified according to whether it matches a pattern. At 610, a determination is made regarding whether a matching pattern is found. If the pattern is not found, at 615 basic SNMP agent processing is performed. If a matching pattern is found, at 625 a check is made to determine whether the cache includes a response corresponding to the request. If a corresponding response is found in the cache, non-data fields such as the request ID are added to the response PDU at 640 and the response is sent at 645.

Figure 7:
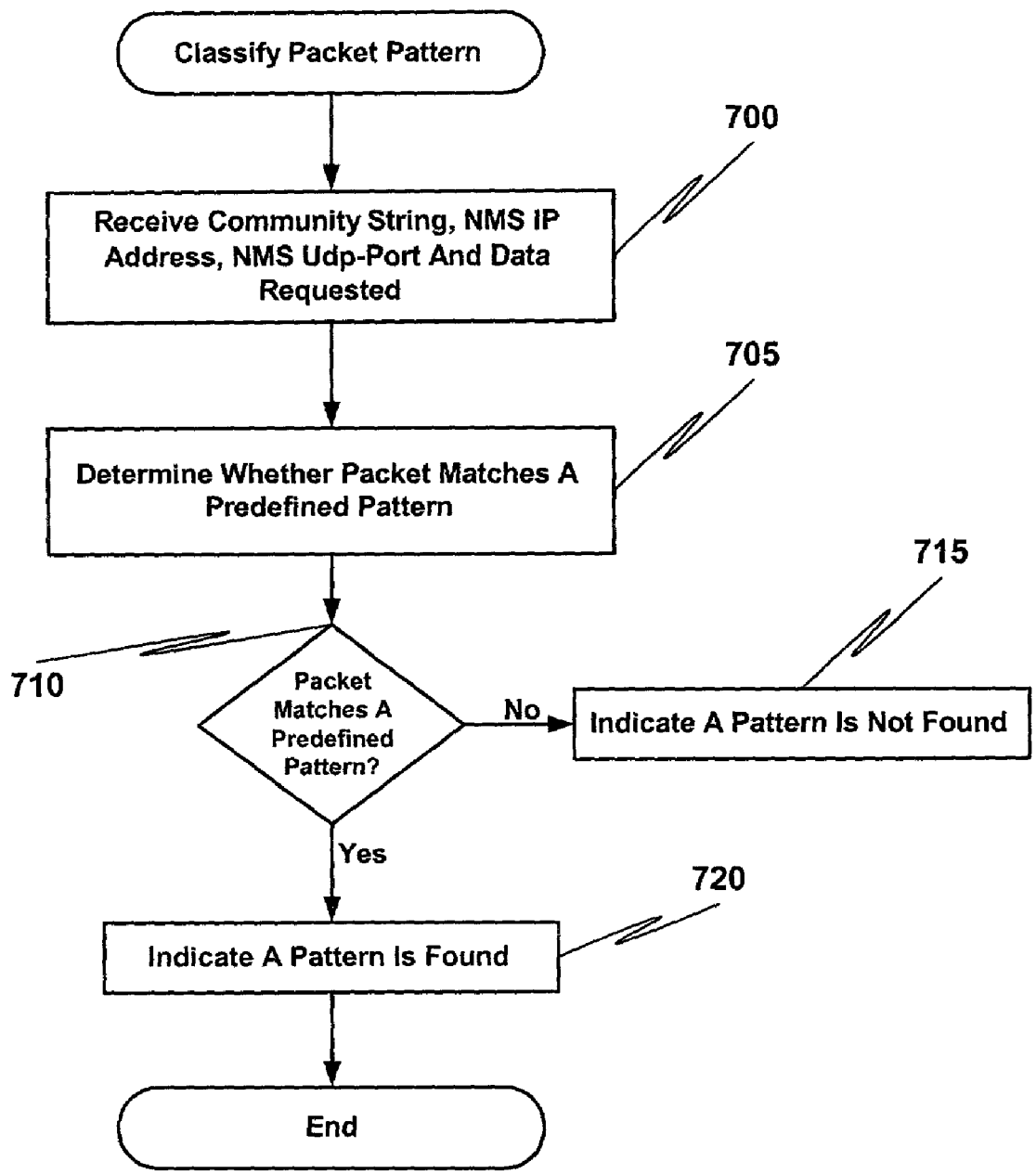
FIG. 7 is a flow diagram that illustrates a method for classifying a SNMP request in accordance with one embodiment of the present invention.

Turning now to FIG. 7, a flow diagram that illustrates a method for classifying a SNMP request in accordance with one embodiment of the present invention is presented. At 700, the community string and data fields of the request PDU and the IP address and port number of the SNMP manager that sent the request are received. A key comprising the community string, NMS IP address and NMS port number is used to select possible patterns. Using the NMS port number allows differentiating between multiple SMNP managers on a NMS. At 705, a determination is made regarding whether the SNMP request matches a predefined pattern. If the request does not match a predefined pattern, an indication that a pattern is not found is made at 715. If the request matches a predefined pattern, an indication that a pattern is found is made at 720.

Figure 8:
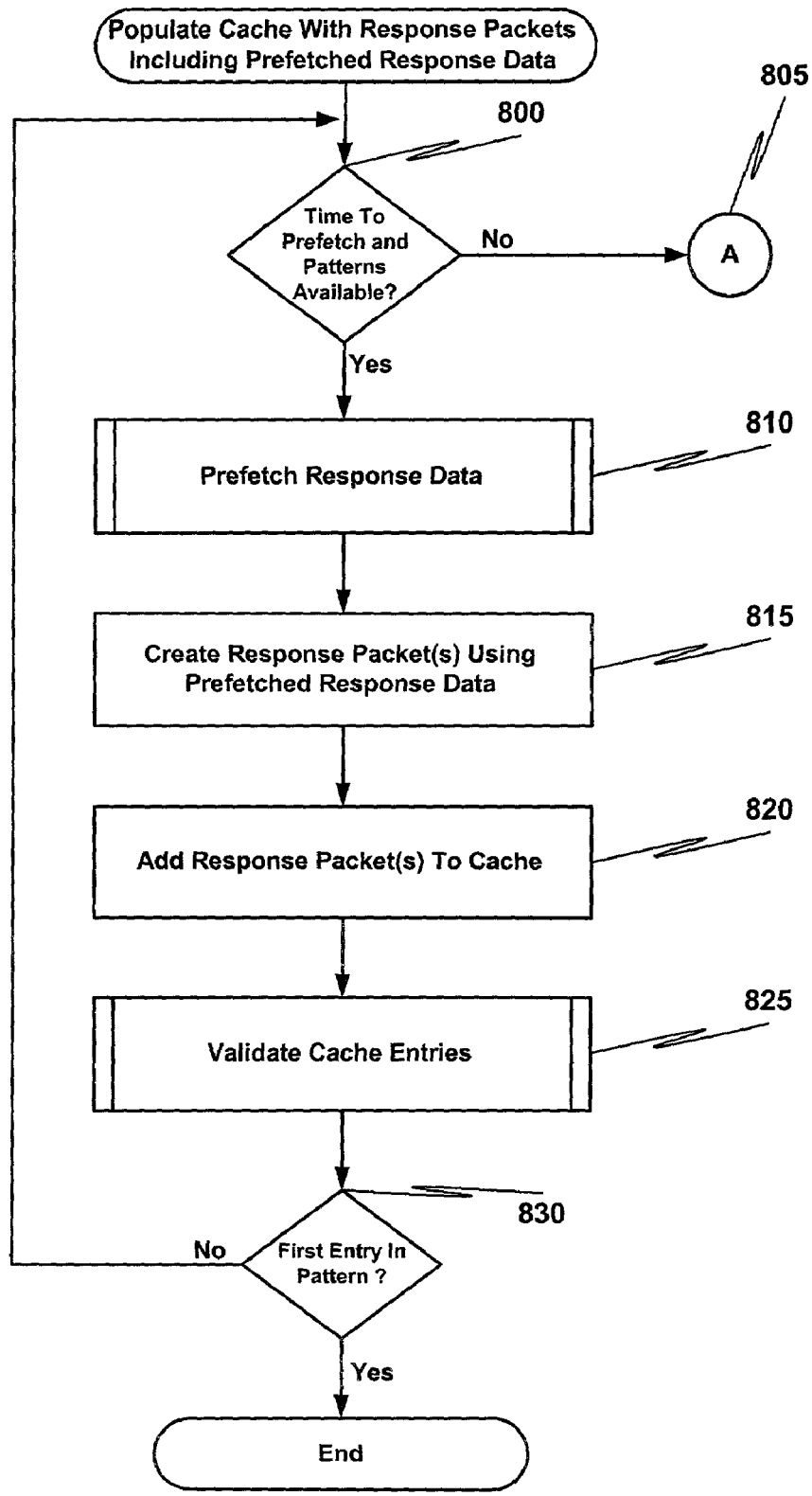
FIG. 8 is a flow diagram that illustrates a method for populating a cache with response packets including prefetched response data in accordance with one embodiment of the present invention.

Turning now to FIG. 8, a flow diagram that illustrates a method for populating a cache with response packets including prefetched response data in accordance with one embodiment of the present invention is presented. At 800, a determination is made regarding whether it is time to prefetch response data and whether patterns are available. It is time to prefetch the data if a burst is imminent, based on the time a trigger request was received and the periodicity of the corresponding pattern. It is also time to prefetch the data when a burst is in progress, such as upon receiving the first request of a pattern. A pattern is available if a request matches a pattern. If it is time to prefetch response data and if patterns are available, the response data is prefetched at 810. At 815, one or more response packets are created for the data obtained at 810. At 820, the one or more response packets are added to the cache. At 825, the cache contents are validated. At 830, a determination is made regarding whether the entry is the first expected request in a pattern. If the entry is not the first expected request in a pattern, processing continues at 800.

Figure 9:
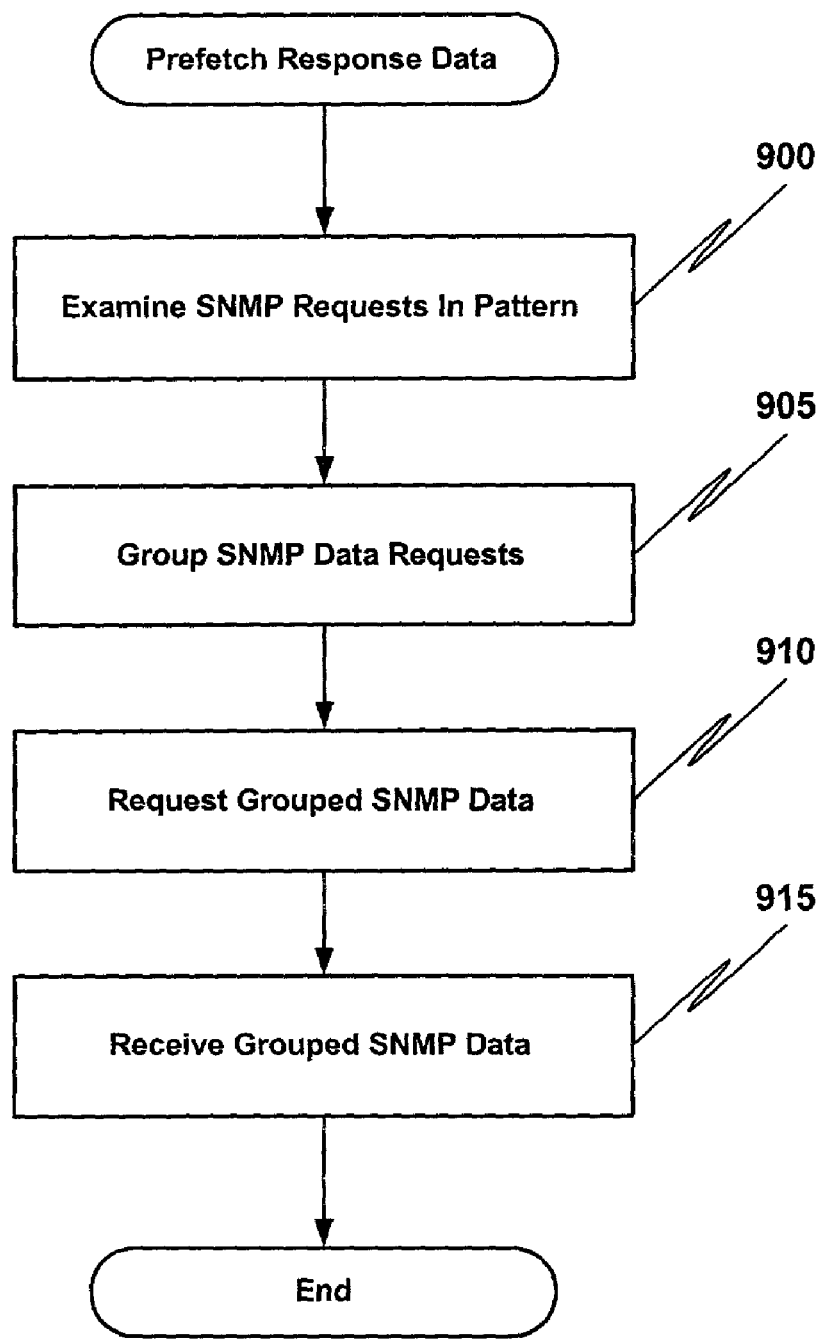
FIG. 9 is a flow diagram that illustrates a method for prefetching response data in accordance with one embodiment of the present invention.

Turning now to FIG. 9, a flow diagram that illustrates a method for prefetching response data in accordance with one embodiment of the present invention is presented. At 900, SNMP requests in the pattern are examined. At 905, the requests are grouped according to the subsystem responsible for supplying the response data. Grouping the requests in this way reduces the amount of inter-process communication by decreasing the number of times the SNMP agent communicates with a subsystem. At 910, the grouped request data is requested from the appropriate subsystem. At 915, the requested data is received from the corresponding subsystem.

Embodiments of the present invention use a validation process to periodically determine the validity of cache contents. A cache entry is flagged as invalid if a predetermined time has elapsed since the data was retrieved from the subsystem responsible for providing the data. This is described in detail below with reference to FIG. 10.

Figure 10:
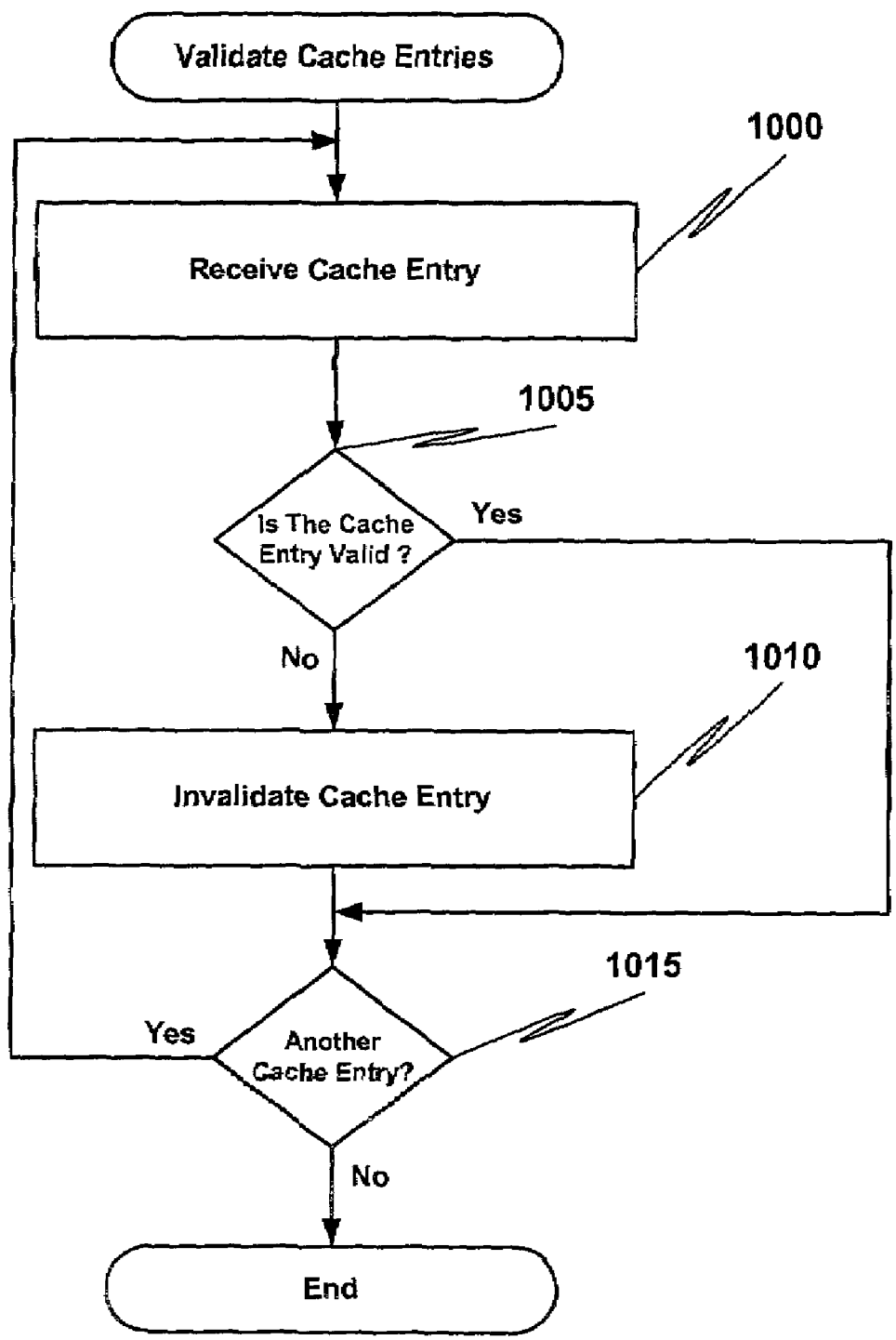
FIG. 10 is a flow diagram that illustrates a method for validating cache entries in accordance with one embodiment of the present invention.

Turning now to FIG. 10, a flow diagram that illustrates a method for validating cache entries in accordance with one embodiment of the present invention is presented. At 1000, a cache entry is received. At 1005, an determination is made regarding whether the cache entry is valid. According to one embodiment of the present invention, the cache entry is invalid if a predetermined amount of time has elapsed since it was obtained from the subsystem responsible for it. According to another embodiment, the cache entry is invalid when the corresponding request within a pattern is removed, such as when a specific request within a pattern is removed or when the entire pattern is removed. If the cache entry is invalid, it is invalidated at 1010. At 1015, a determination is made regarding whether another cache entry needs to be checked. If another cache entry needs to be checked, processing continues at 1000.

Figure 11A:
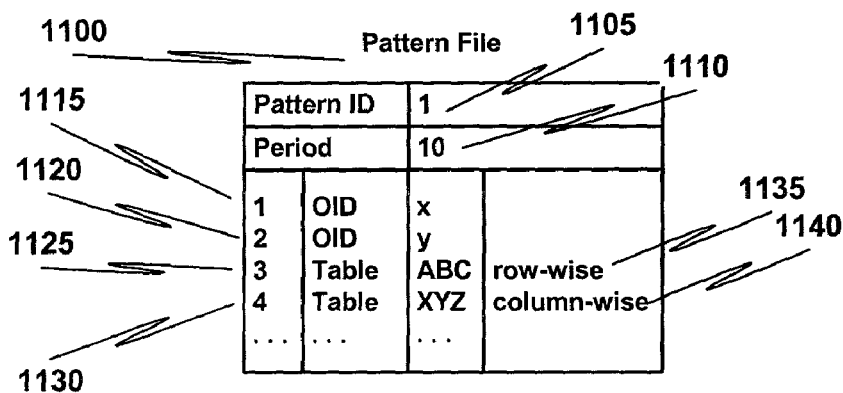
FIG. 11A is a block diagram that illustrates a pattern file in accordance with one embodiment of the present invention.
Figure 11B:
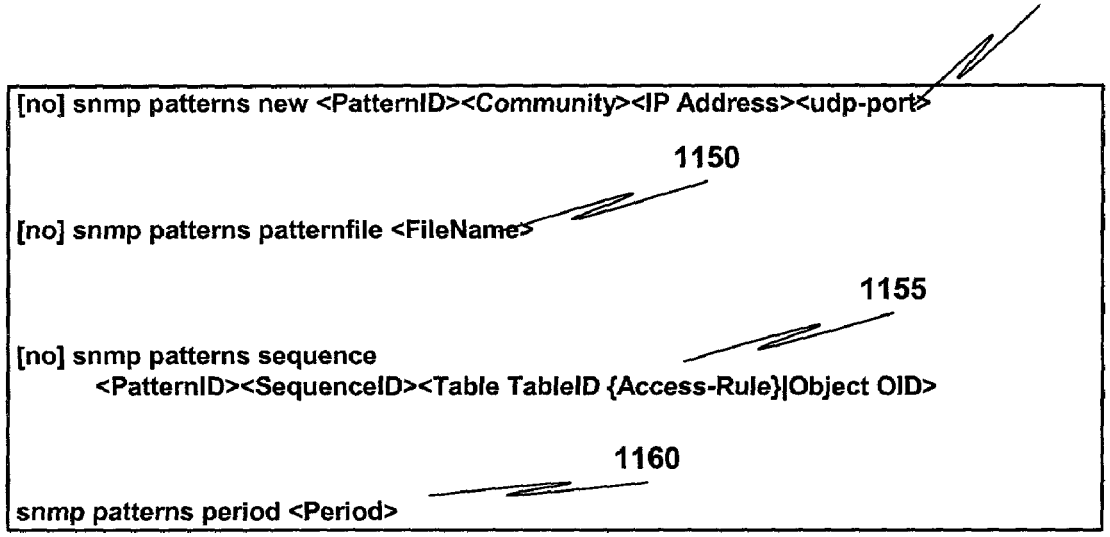
FIG. 11B is a block diagram that illustrates a command language interface in accordance with one embodiment of the present invention.

FIGS. 11A-11B illustrate an exemplary pattern file and a corresponding user interface to configure one or more patterns. FIGS. 11A-11B are for purposes of illustration and are not intended to be limiting in any way. Those of ordinary skill in the art will recognize that many pattern representations and user interfaces are possible without departing from the inventive concepts disclosed herein.

Turning now to FIG. 11A, a block diagram that illustrates a pattern file in accordance with one embodiment of the present invention is presented. Pattern file 1100 includes a pattern ID 1105, a period indication 1110 and the requested data 1115-1130. As shown in FIG. 11A, the requested data includes object x 1115, object y 1120, table ABC 1125 and table XYZ 1130. According to one embodiment of the present invention, a table is traversed row-wise by default. According to another embodiment of the present invention, the access rule is specified as shown at reference numerals 1135 and 1140.

Turning now to FIG. 11B, a block diagram that illustrates a command language interface in accordance with one embodiment of the present invention is presented. The "new" command 1145 creates a new pattern identified by a pattern ID. The "patternfile" command 1150 specifies a file that includes pattern information. The "sequence" command 1155 specifies a particular request within a pattern. The "no" prefix performs a delete function. More specifically, the "no snmp patterns new" command removes a pattern, the "no snmp patterns patternfile" command removes a pattern file and the "no snmp patterns sequence" command removes a request within a pattern. The "period" command 1160 specifies the burst period.

Figure 11C:
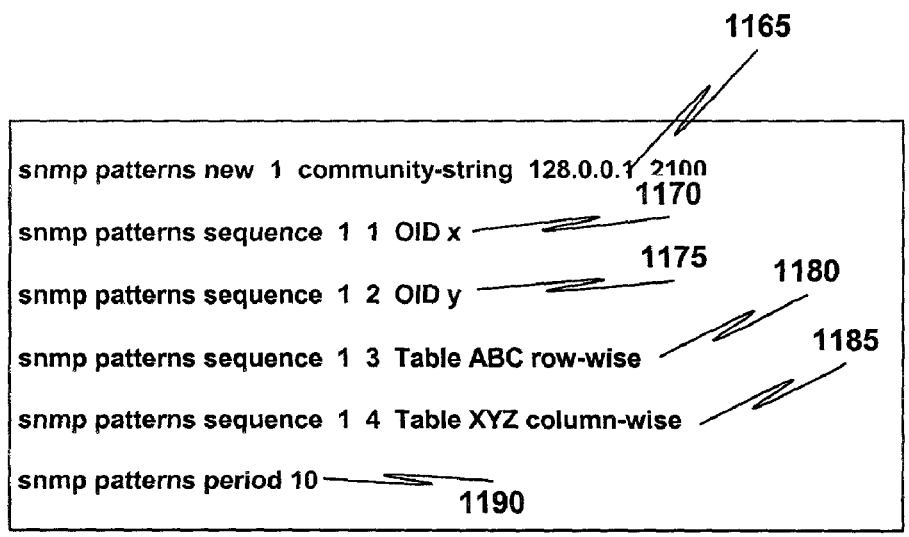
FIG. 11C is a block diagram that illustrates using the command language interface of FIG. 11B to configure the pattern file of FIG. 11A in accordance with one embodiment of the present invention.

FIG. 11C is a block diagram that illustrates using the command language interface of FIG. 11B to configure the pattern file of FIG. 11A in accordance with one embodiment of the present invention. Command 1165 specifies a new pattern with a pattern ID of 1. Command 1170, 1175, 1180 and 1185 specify requests for data items 1115, 1120, 1125 and 1130, respectively. Command 1190 specifies a burst period of 10.

One advantage of the present invention is that a network agent can group a set of requests internally, significantly reducing inter-process communication and processing times. Additionally, data required for a response may be obtained before the request is received, thereby improving response time, increasing the amount of data that may be requested per unit time and minimizing CPU processing spikes. Also, embodiments of the present invention may be implemented using the SNMP protocol and without modifying a NMS.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for predictively responding to a network management data request, the method comprising:
receiving a first network management data request;
determining if the first network management data request matches a pattern of request defined and stored in advance in a memory, the pattern including one or more expected management data requests;
determining if data responsive to the first network management data request is contained in a cache of prefetched network management data if the first network management data request matches a pattern defined in the memory;
sending a response including the data responsive to the first network management data request, if the data responsive to the first network management data request is contained in the cache and if the first network management data request matches a pattern defined in the memory;
collecting, if the first network management data request matches a pattern defined in the memory, data responsive to any remaining network management data requests in the matched pattern, wherein the pattern further comprises a periodicity of the network management data requests contained in the pattern, and wherein the network management data request is a Simple Network Management Protocol (SNMP) request; and
if the first network management data request matches a pattern defined in the memory, but data responsive to the first network management data request is not contained in the cache, initiating periodic data collections for data responsive to network management data requests in the pattern.

2. The method of claim 1, further comprising:
transmitting the first network management data request to a network management data core to respond to the first network management data request if the first network management data request does not match a pattern defined in the memory.

3. The method of claim 1, wherein the initiating includes initiating periodic data collections at a rate matching a periodicity of the network management data requests contained in the pattern.

4. The method of claim 1, wherein the determining if a first network management request matches a pattern of request based on at least one of:
a community string;
a network management system IP address; or
a network management system port number.

5. The method of claim 1 wherein the determining if a first network management request matches a pattern of request is based at least in part on a community string.

6. An apparatus for predictively responding to a network management data request, the apparatus comprising:
a storage memory adapted to define and store in advance at least one pattern of request, the pattern of request including one or more expected network management data requests;
a cache memory adapted to store prefetched network management data;
a request classifier configured to determine if a first network management data request matches a pattern defined in the storage memory and further configured to determine if data responsive to the first network management data request is contained in the cache memory if the first network management data request matches a pattern defined in the memory;
a sender coupled to the request classifier configured to send a response including the data responsive to the first network management data request, if the data responsive to the first network management data request is contained in the cache memory and if the network management data request matches a pattern defined in the storage memory;
a lookahead processor coupled to the request classifier configured to collect, if the first network management data request matches a pattern defined in the storage memory, data responsive to any remaining network management data requests in the matched pattern, wherein the pattern further comprises a periodicity of the network management data requests contained in the pattern, and wherein the network management data request is a Simple Network Management Protocol (SNMP) request; and
wherein the lookahead processor is further configured to initiate periodic data collections for data responsive to the network management data requests in the pattern, if the first network management data request matches a pattern defined in the memory, but data responsive to the first network management data request is not contained in the cache.

7. The apparatus of claim 6, further comprising:
an interface coupled to the request classifier configured to transmit the first network management data request to a network management data core to respond to the first network management data request if the first network management data request does not match a pattern defined in the storage memory.

8. The apparatus of claim 6, wherein the lookahead processor is further configured to initiate periodic data collections at a rate matching a periodicity of the network management data requests contained in the pattern.

9. The apparatus of claim 6, wherein the request classifier uses, in determining if a first network management data request matches a pattern, at least one of:
a community string;
a network management system IP address; or
a network management system port number.

10. The apparatus of claim 6 wherein the request classifier uses a community string in determining if a first network management data request matches a pattern.

11. An apparatus for predictively responding to network management data requests, the apparatus comprising:
a storage memory adapted to define and store in advance a pattern of request, the pattern including one or more expected network management data requests;
a cache memory adapted to store prefetched network management data;
means for determining if a first network management data request contains a pattern defined in the storage memory;
means for determining if data responsive to the first network management data request is contained in the cache memory if the first network management data request contains a pattern defined in the storage memory;
means for sending a response including data responsive to the first network management data request, if the data responsive to the first network management data request is contained in the cache memory and if the network management data request matches a pattern defined in the storage memory;
means for collecting, if the first network management data request matches a pattern defined in the storage memory, data responsive to any remaining network management data requests in the matched pattern, wherein the pattern further comprises a periodicity of the network management data requests contained in the pattern, and wherein the network management data request is a Simple Network Management Protocol (SNMP) request; and means for initiating periodic data collections for data responsive to network management data requests in the pattern, if the first network management data request matches a pattern defined in the storage memory, but data responsive to the first network management data request is not contained in the cache memory.

12. The apparatus of claim 11, further comprising:

means for transmitting the first network management data request to a network management data core to respond to the first network management data request if the first network management data request does not match a pattern defined in the storage memory.

13. The apparatus of claim 11, wherein the means for initiating includes means for initiating periodic data collections at a rate matching the periodicity of network management data requests contained in the pattern.

14. The apparatus of claim 11, wherein the means for determining if a first network management data request matches a pattern uses at least one of:

a community string;

a network management system IP address; or a network management system port number.

15. The apparatus of claim 11 wherein the means for determining if a first network management request matches a pattern of request further comprises means for determining if a first network management request matches a pattern of request based at least in part on a community string.

16. A program storage device, readable by a machine, embodying a program of instructions executable by the machine to perform a method for predictively responding to a network management data request, the method comprising:

receiving a first network management data request;

determining if the first network management data request matches a pattern of request defined and stored in advance in a memory, the pattern including one or more expected management data requests;

determining if data responsive to the first network management data request is contained in a cache of prefetched network management data if the first network management data request matches a pattern defined in the memory;

sending a response including the data responsive to the first network management data request, if the data responsive to the first network management data request is contained in the cache and if the first network management data request matches a pattern defined in the memory;

collecting, if the first network management data request matches a pattern defined in the memory, data responsive to any remaining network management data requests in the matched pattern, wherein the pattern further comprises a periodicity of the network management data requests contained in the pattern, and wherein the network management data request is a Simple Network Management Protocol (SNMP) request; and if the first network management data request matches a pattern defined in the memory, but data responsive to the first network management data request is not contained in the cache, initiating periodic data collections for data responsive to network management data requests in the pattern.

17. The program storage device of claim 16, wherein the method further comprises:

transmitting the first network management data request to a network management data core to respond to the first network management data request if the first network management data request does not match a pattern defined in the memory.

18. The program storage device of claim 16, wherein the initiating includes initiating periodic data collections at a rate matching a periodicity of the network management data requests contained in the pattern.

19. The program storage device of claim 16, wherein the determining if a first network management request matches a pattern of request based on at least one of:

a community string;

a network management system IP address; or a network management system port number.

20. The program storage device of claim 16 wherein the determining if a first network management request matches a pattern of request is based at least in part on a community string.

* * * * *

UNITED STATES PATENT AND TRADEMARK OFFICE
CERTIFICATE OF CORRECTION

PATENT NO.      : 7,610,357 B1                         Page 1 of 1
APPLICATION NO. : 09/895047
DATED           : October 27, 2009
INVENTOR(S)     : Santosh S. Chandrachood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twelfth Day of October, 2010

David J. Kappos
*Director of the United States Patent and Trademark Office*